United States Patent
Sato

[15] 3,682,283
[45] Aug. 8, 1972

[54] MOTOR-DRIVEN ACTUATOR AND SAFETY OVERLOAD MECHANISM THEREFOR

[72] Inventor: Mitumasa Sato, 835-5, Hongocho, Fukuyama, Hiroshima Prefecture, Japan

[22] Filed: March 2, 1971

[21] Appl. No.: 120,231

[30] Foreign Application Priority Data

March 2, 1970 Japan......................45/17114
June 20, 1970 Japan......................45/60779

[52] U.S. Cl..............192/141, 192/142 R, 192/143, 192/150, 310/68 C, 318/469
[51] Int. Cl............................................F16d 71/00
[58] Field of Search............310/68, 68 C, 80, 83, 75; 318/468, 469; 74/459; 192/141, 142, 143, 150

[56] References Cited

UNITED STATES PATENTS

| | | | |
|---|---|---|---|
| 2,978,621 | 4/1961 | Martinek | 310/83 |
| 2,366,739 | 1/1945 | McCoy | 192/142 |
| 2,444,886 | 7/1948 | Vickers | 74/459 |
| 2,868,030 | 1/1959 | Forwald | 192/143 |
| 2,854,113 | 9/1958 | Hallden | 192/143 |
| 1,279,346 | 9/1918 | Hultgren | 192/143 |
| 3,165,656 | 1/1965 | Korthaus | 310/68 |

Primary Examiner—J. D. Miller
Assistant Examiner—R. Skudy
Attorney—Robert E. Burns and Emmanuel J. Lobato

[57] ABSTRACT

A motor-driven actuator comprises an electric motor connected to rotationally drive a threaded shaft and a piston member in threaded engagement with the threaded shaft whereby rotation of the threaded shaft effects reciprocal movement of the piston member. A safety mechanism is incorporated into the actuator to automatically deenergize the electric motor whenever an overload condition exists thereby preventing damage to the internal components of the actuator. The safety mechanism comprises a pair of limit switches and a splined coupling interconnecting the motor output shaft and the shaft and the threaded shaft allowing axial sliding movement of, the threaded shaft to effect actuation of one of the limit switches in response to an overloading of the actuator.

10 Claims, 4 Drawing Figures

MOTOR-DRIVEN ACTUATOR AND SAFETY OVERLOAD MECHANISM THEREFOR

The present invention relates to a motor-driven actuator applicable to various fields, such as the ascension and descension of heavy weights, the opening and closing of doors and hopper gates, the alignment and positioning of work materials, the control of industrial robbots and the like. In particular, the motor-driven actuator of the present invention comprises a threaded screw which is rotationally driven by an electric motor to effect reciprocation of a piston member in threaded engagement with the threaded screw.

The conventional motor-driven actuator is constructed to stop the reciprocating movement of the piston member at the termination of each stroke by arranging limit switches at the two terminal stroke positions of the piston member or at the terminal stroke positions of the driven load member which is driven by the actuator. Consequently, even when the limit switch is in its "OFF" position, the inertia of the driving motor continues to advance the piston member to some extent whereupon the accuracy of stopping is greatly reduced at the end of the stroke. Furthermore, when impulsive force are externally applied on the piston member, such often results in breakage or irreparable damage to the screw threads on the screw and the piston member.

It is therefore a primary object of the present invention to eliminate the above-mentioned defects of conventional motor-driven actuators by providing a safety mechanism which effects momentary stoppage of the driving motor when a load greater than a predetermined value is applied to the actuator to prevent damage to the driving motor and the actuator.

Another object of the present invention is to automatically interrupt the current supply to the electric driving motor when the piston member reaches the end of each stroke and also to provide a padding effect to the threaded screw shaft so as to absorb any impulsive reaction forces due to externally applied forces on the actuator.

Having in mind the above and other objects that will be evident from a reading of this disclosure, the invention comprises the devices, combinations and arrangements of parts as illustrated in the preferred embodiment of the invention which is hereinafter set forth in such detail as to anable those skilled in the art to readily understand the function, operation, constructions and advantages of it when read in conjunction with the accompanying drawings wherein.

Figure 1:
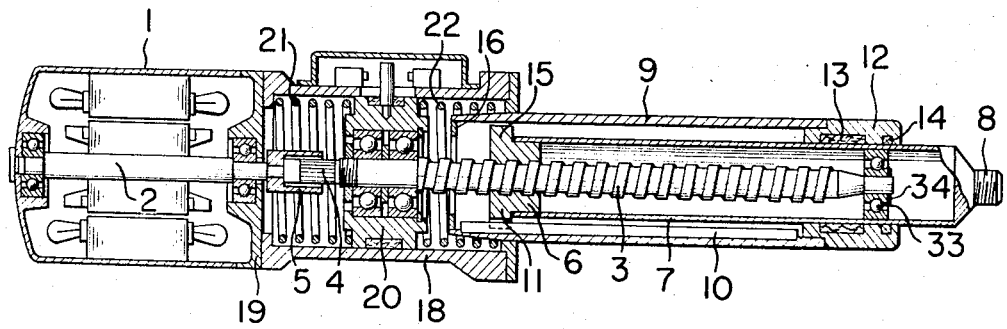
FIG. 1 is a longitudinal cross-sectional view of a motor-driven actuator embodying the principles of the present invention.

Referring to FIG. 1, electrically energizable rotary driving means comprising an electric driving motor 1 is employed which provides a rotational output in both directions in response to current applied thereto. A threaded screw 3 is rotatably mounted in alignment with the longitudinal axis of the motor shaft 2. The threaded screw 3 is connected at one end 4 to the motor shaft 2 through a spline coupling 5 and therefore the screw 3 is mounted for sliding movement in the axial direction relative to the motor shaft 2 while the rotation of the motor shaft 2 is directly transmitted to the screw 3. The spline coupling 5 is of well known construction and comprises a plurality of female grooves extending in the axial direction on the inner wall of a cylindrical sleeve arranged at the terminal portion of the motor shaft 2 and a plurality of mating axial male grooves provided in the end portion 4 of the threaded screw. The male and female grooves are slidably engaged together to define the spline coupling. A movable piston 7 is fastened to a threaded nut 6 in which is screwed the threaded screw 3. The movable piston 7 and the nut 6 comprise a working piston member which is reciprocally mounted within a cylinder 9 and a threaded connection is provided at the distal end of the piston 7 to connect same with the output load which is to be moved.

A key rod 10 is fastened to the inner wall of the outer cylinder 9 and extends axially along the cylinder to mount the piston member for reciprocal but not rotational movement. A key groove 11 is provided on the outer wall of the nut 6 and slidably engages with the key rod 10. By such a construction, the rotational movement of the threaded screw shaft 3 effects translational movement of the piston member.

A cylindrical collar 12 slidably supports the body of the piston 7 and is fastened to one end of the outer cylinder 9. An oil-containing elastic seal 13 and a mechanical seal 14 are imbedded in the inner surface of the cylindrical collar 12 and effectively prevent dust and other contaminants from entering into the actuator interior as the piston member reciprocates. The cylindrical collar 12 also serves to define the terminal position or end stroke of the working member when the piston member extends out of the cylinder 9 and hits or abuts against the annular flange 15 formed on the outer peripheral wall of the nut 6. An annular stopper 16 is fastened to the other end of the outer cylinder 9 and such defines the other terminal position or end stroke of the piston member.

The connecting end of the outer cylinder 9 is fastened to the front end of a cylindrical bracket 18 by means of a fastening flange 17. The rear end of the bracket 18 is fastened to the front end of a motor casing 19. An intermediate supporting member 20 is axially and slidably mounted within the interior of the cylindrical bracket 18 and compression springs 21, 22 are inserted on both sides of the intermediate supporting member 20 and bias same with a preselected biasing force into the middle position shown in FIG. 1. Accordingly, the intermediate supporting member can undergo axially sliding movement only when a thrust force greater than the spring force is applied thereto.

In addition, the intermediate supporting member 20 rotatably supports the end portion of the screw shaft 3 by means of a rotary ball bearings 23, 24. A snap spring 25 is imbedded in the inner wall of the intermediate supporting member 20 and engages with the end portion of the bearing 24. A washer 26 is inserted between the ball bearings 23 and 24 and a nut 27 engages with a threaded portion formed on the screw 3 to tightly screw the inner race of the bearing 23 against the washer 26. By such a construction, the rotation of the screw shaft 3 is not transmitted to the intermediate supporting member 20 which is axially slidable together with the screw shaft 3.

The safety mechanism of the present invention comprises a stopper pin 28 connected to the wall of the intermediate supporting member 20 and penetrating through a slot 29 provided in the side wall of the cylindrical bracket 18. A pair of limiting switches 30, 31 are arranged on the outer wall of the bracket 18 and are respectively positioned a predetermined distance on either side of the stopper pin 28. The limiting switches 30, 31 are electrically connected to the motor 1 by suitable circuitry (not shown) and function to interrupt the current flow to the motor 1 to deenergize same in response to actuating contact with the stopper pin 28. A cover 32 is provided over the limiting switches to suitably protect them.

The inner race of a bearing 33 is mounted on the front end of the screw shaft 3 and is fastened thereto by means of a snap ring 34. The outer race of the bearing 33 is disposed in slidable contact with the inner surface of the piston 7. Therefore the front end of the screw 3 is slidable within the piston 7 and the screw is prevented from irregular vibrations during its rotation.

In operation of the actuator, the motor 1 is energized causing rotational movement in one direction of the motor shaft 2 which is transmitted by the spline coupling 5 to effect rotation of the screw shaft 3 whereupon the piston member, composed of the nut 6 and the piston 7, is extended out of the cylinder 9 and effects a corresponding movement of the output load connected to the front end of the piston member. When the motor 1 is rotated in the reverse direction, the piston member is retracted back into the cylinder 9 accompanied by corresponding movement of the output load.

In order to mount the motor-driven actuator, the side wall of the cylindrical bracket 18 may be fastened by the aid of trunnion (not shown) or the rear end of the motor 1 may be fastened with a clevice. Alternatively, some rigid portion of the actuator frame may be fastened by means of screws to a support frame.

The safety mechanism of the present invention functions in the following manner. Assume that the electric motor 1 is operated in the proper mode to effect rotation of the threaded shaft 3 in the direction which effects extension of the piston member from the cylinder 9. If the output load connected to the piston member is suddenly increased beyond a predetermined value or if the load is initially above the predetermined value, the piston member will not be further extended in response to rotation of the threaded shaft 3. Under these conditions, the actuator operates in a reverse mode and continued rotation of the threaded shaft 3 causes same to translate back into the actuator in a direction opposite to the extension of the piston member. In other words, the nut 6 is held stationary by the excessive load and rotation of the screw shaft 3 causes same to thread itself back out of the nut 6.

Figure 2:
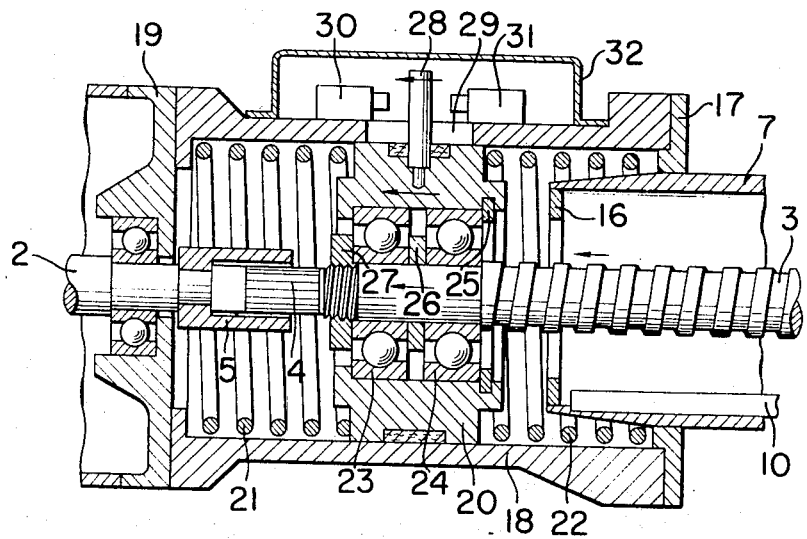
FIG. 2 is an enlarged view of a safety device according to the present invention.

As seen in FIG. 2, the screw shaft 3 along with the intermediate supporting member 20 translate in the direction of the arrows against the biasing force of the compression spring 21 until the stopper pin 28 actuates the limiting switch 30. Actuation of the limiting switch 30 immediately shuts off or deenergizes the electric motor thereby protecting the actuator and all its internal components from possible damage due to overloading. The safety mechanism operates in a similar manner during retraction of the piston member only in this instance, the screw shaft 3 is rotated in the reverse direction and is advanced longitudinally until the stopper pin actuates the limiting switch 31.

It should be noted that the safety mechanism of the present invention also functions like the traditional limiting switches when the piston member reaches the end of its working stroke. During this mode of operation, the annular flange 15 engages either the cylindrical collar 12 when the piston member reaches the end of its extension stroke or abuts against the stopper member 16 when the piston member is fully retracted causing respective actuation of the limiting switches 30 and 31. Consequently, the separate limiting switches normally provided at the ends of the piston stroke for the stoppage of the motor in the conventional motor-driven actuators are not necessary in the present invention. In addition, when an impulse load is applied to the exterior of the piston member, the springs 21, 22 effectively absorb the impulse thereby protecting the screw threads and other components. Moreover, since the piston member is biased in both directions by the springs 21, 22 any displacement due to the inertia of the moving parts after the motor is deenergized is effectively eliminated thereby providing extremely accurate stopping positions.

The safety device as described above defines the maximum capacity of the motor-driven actuator and as may be readily understood, the capacity can be easily controlled by replacing the springs 21, 22 with springs having different spring constants and by displacing the limiting switches 30, 31 different distances from the stopper pin 28. The machine capacity is therefore optionally chosen and established to best suit the particular output load with which it is used and such permits the most effective utilization of the electric driving motor.

The motor-driven actuator of the present invention contains a compact arrangement of the motor 1, screw shaft 3, piston member, etc., and thus can be moved and easily mounted in any position. Moreover, since an electric control system is employed, all the standard switching operations, such as pulling, drawing, inching, holding, continuous compression, continuous traction, etc., may be conveniently utilized.

Figure 3:
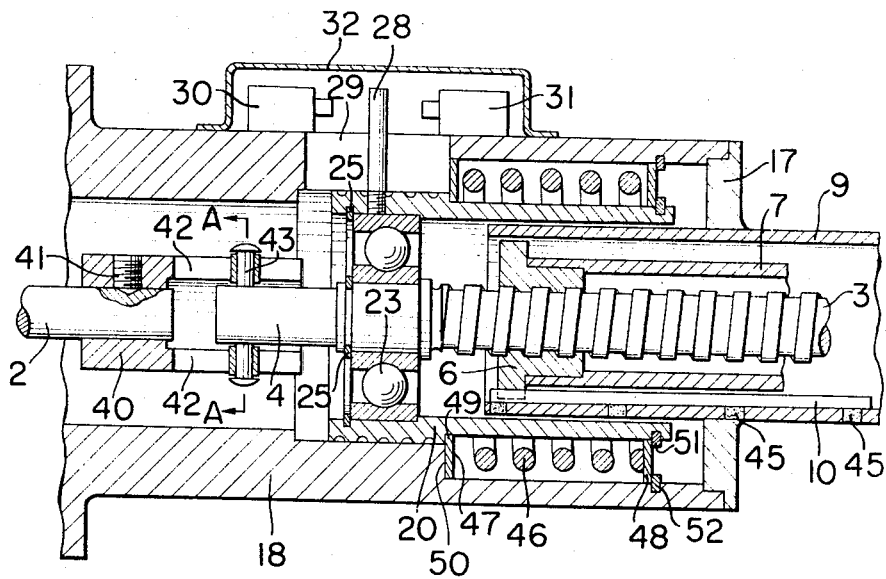
FIG. 3 is a longitudinal cross-sectional view of another motor-driven actuator embodying the principles of the present invention.
Figure 4:
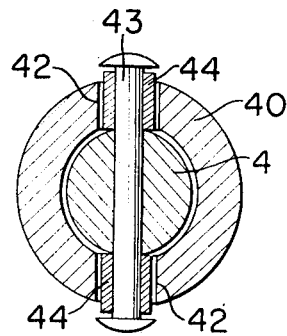
FIG. 4 is an enlarged cross-sectional view taken along line A—A of FIG. 3.

FIGS. 3 and 4 show another motor-driven actuator embodying the principles of the present invention and like reference characters are used to refer to parts which are similar to those shown in FIGS. 1 and 2.

As seen in FIG. 3, a slidable coupling 40 connects the motor shaft 2 with the threaded screw shaft 3 and comprises a cylindrical sleeve having one end connected firmly to the motor shaft 2 with a screw 41 and the other end terminating in a cylinder slidably disposed over an end of the screw shaft 3. The slidable coupling 40 is provided with diametrically disposed grooves or axial notches 42 and a pin 43 is fitted into a pair of annular, rotatable bushings 44, composed of metal or plastic, which are slidably disposed within the respective grooves 42. The slidable coupling 40 functions in a similar manner as the spline coupling 5 to transmit the rotation of the motor shaft 2 to screw shaft 3 while permitting the screw shaft 3 to slide in the axial direction relative to the motor shaft 2. An advantage of the slidable coupling 40 is that the rotation of the bushings 44 in contact with the respective wall portions of the notches 42 during the sliding of the screw shaft 3 prevents abrasion and wear of the pin 43 and the notches 42 and at the same time, smoothens the sliding contact between them by decreasing the sliding resistance. Moreover, even when the motor shaft 2 is not properly aligned with the screw shaft 3, such a coupling still functions effectively and hence is particularly advantageous for use with the actuator of the present invention.

The present example is different from that shown in FIG. 1 in the manner of mounting the key rod 10. According to this embodiment, numerous perforations 45 are arranged along a straight line in the wall of the outer cylinder 9. The key rod 10 is abutted against the inner face of the perforations and welded to the cylinder 9 from outside the cylinder whereupon the weld material fills the perforations 45. The key rod 10 is therefore easily mounted, even if a relatively long cylinder 9 is used. In the conventional apparatus, a key groove and cooperating key are formed directly on the cylinder 9 and such is disadvantageous in that the cylinder 9 must then have an excessive thickness corresponding to the depth of the key groove and such necessitates a very difficult machining operation to form the key groove in the inner wall of the cylinder and the manufacturing cost is very expensive. On the contrary, the key rod of the present invention is easily attached to the cylinder and permits the manufacturing cost to be cut down because of both an easier machining operation and a thinner cylinder wall.

In this embodiment, the intermediate supporting member 20 is prevented from sliding axially in the left and right directions by means of a single thrust or biasing spring 46. A pair of shoulders 49, 50 are formed respectively on the outer wall of the intermediate supporting member 20 and on the inner wall of bracket 18 to engage with and hold in place a washer 47. A pair of annular snap springs 51, 52 are imbedded respectively in the outer wall of the intermediate supporting member 20 and in the inner wall of the bracket 18 to engage with and hold in place another washer 48. Therefore the intermediate supporting member 20 must compress the biasing spring 46 in order to undergo any axial sliding movement and such a mode of operation is the same as that of the apparatus shown in FIGS. 1 and 2, but is more compact and hence more suitable for smaller machines. In addition, if the spring 46 is carefully selected and inserted under a predetermined pressure, the limiting switches can be operated after only a slight deformation of the spring and thus a high accuracy actuator may be constructed in a comparatively simple manner.

Alternatively, the above described two examples may employ elastomers, such as robbers, in place of the biasing springs 21, 22 and 46. Moreover, when the motor shaft 2 is not aligned with the screw shaft 3 and when it is necessary to transmit the power from the electric motor 1 while changing the rotational speed, then the known combination of a spur gear and a pinion spur gear may be effectively used to couple the motor to the screw shaft 3. Furthermore, when the loading angle of the screw shaft 3 and the threaded screw of the nut 6 is small, the self-locking action of the screw can effect continuous compression and continuous traction. In addition, even if an electromagnetic brake is coupled to the motor so that the brake functions to stop the motor, the continuous compression, continuous traction and holding operation are still possible in a manner similar to the preceding description. These improved results have heretofore not been obtainable with the conventional pneumatic actuators.

What I claim and desire to secure by letters patent is:

1. An actuator comprising: means defining a housing; a piston member disposed within said housing and having means therein defining an axially extending threaded opening; mounting means mounting said piston member for reciprocal sliding movement in an axial direction within said housing and in rotational rigid relationship with respect to said housing; a rotatable threaded shaft in threaded engagement with said threaded opening; electrically energizable rotary driving means operative when energized to rotationally drive said threaded shaft in both a given rotary direction and another rotary direction opposite thereto to effect reciprocal sliding movement of said piston member; and safety means operative during rotation of said threaded shaft and in response to an external load applied to said piston member greater than a predetermined value for effecting translational movement of said rotatable threaded shaft a pre-selected distance relative to said piston member in a direction opposite to the direction of sliding movement of said piston member immediately before application of said external load to effect deenergization of said electrically energizable rotary driving means whereby said actuator is safely shut off whenever an overload condition exists.

2. An actuator according to claim 1; wherein said safety means includes means mounting said rotatable threaded shaft for axial translational movement relative to said piston member comprising a supporting piston member slidably mounted within said housing in axially spaced-apart relationship from said piston member, and means mounting said rotatable threaded shaft for rotational movement integral with said electrically energizable rotary driving means and relative to said supporting piston member and for sliding movement integral with said supporting piston member and relative to said electrically energizable rotary driving means.

3. An actuator according to claim 2; wherein said safety means includes a pin projecting outwardly from said supporting piston member and axially movable therewith, and a pair of limiting switches disposed along the path of travel of said pin on opposite sides thereof individually operative when actuated to effect deenergization of said electrically energizable rotary driving means.

4. An actuator according to claim 2; including spring means biasing said supporting piston member with a predetermined force into a normal axial position whenever a load less than said predetermined value is applied to said piston member.

5. An actuator according to claim 4; wherein said spring means comprises a pair of compression springs respectively positioned within said housing on opposite sides of said supporting piston member.

6. An actuator according to claim 4; wherein said spring means comprises a first abutting surface integral with said housing, a second abutting surface integral with said supporting piston member, and a compression spring disposed between said first and second abutting surfaces.

7. An actuator according to claim 2; wherein said means mounting said rotatable threaded shaft for rotational movement integral with said electrically energizable rotary driving means and sliding movement relative to said electrically energizable rotary driving means comprises a cylindrical member having axially extending splines disposed in circumferentially spaced-apart relationship around the interior thereof and connected for rotation with said electrically energizable rotary driving means, and complementary axially extending splines on an end portion of said rotatable threaded shaft in engagement with the splines on said cylindrical member.

8. An actuator according to claim 2; wherein said means mounting said rotatable threaded shaft for rotational movement integral with said electrically energizable rotary driving means and sliding movement relative to said electrically energizable rotary driving means comprises a cylindrical member having means therein defining a pair of axially extending opposed slots and connected for rotation with said electrically energizable rotary driving means, a pin extending through an end portion of said rotatable threaded shaft and projecting outwardly therefrom into said opposed slots, and a pair of bushings each rotatably mounted on said pin at a portion thereof wherein same projects into respective ones of said slots.

9. An actuator according to claim 1; wherein said mounting means comprises an elongated key extending axially along a portion of said housing and connected thereto, and means defining a groove in said piston member slidably accommodating therein said elongated key whereby said piston member may slide along said key but is prevented from rotating by said key.

10. An actuator according to claim 9; including means defining a plurality of axially spaced-apart apertures in said portion of said housing beneath said elongated key, and welded connections in said apertures connecting said elongated key to said housing.

* * * * *